Jan. 24, 1950
F. W. MEREDITH
2,495,591
CONTROL EQUIPMENT FOR STABILIZING A
PLATFORM MOUNTED IN A CRAFT
Filed Feb. 21, 1944
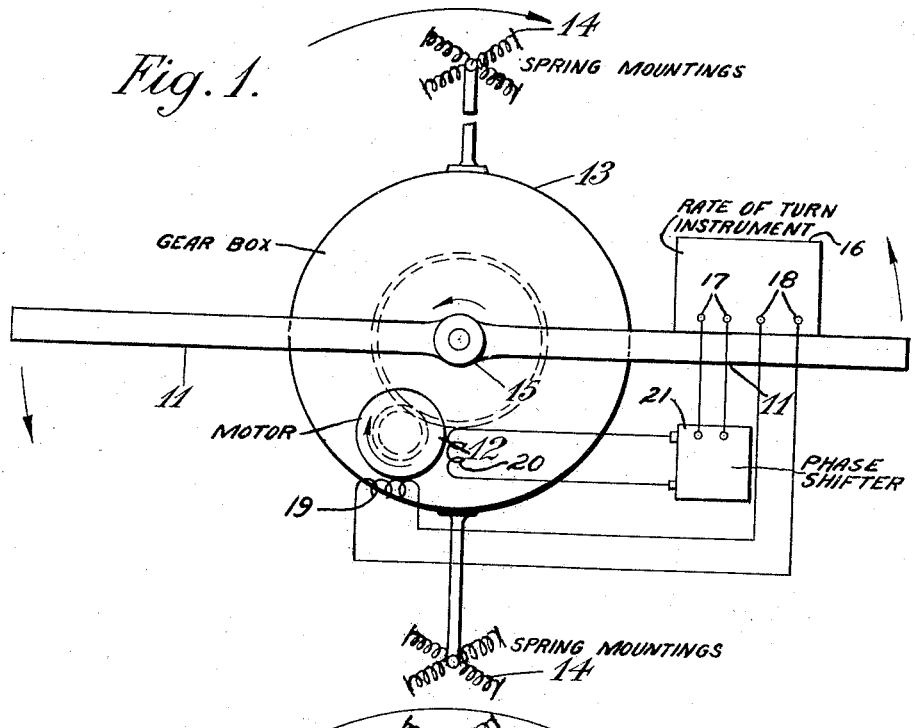
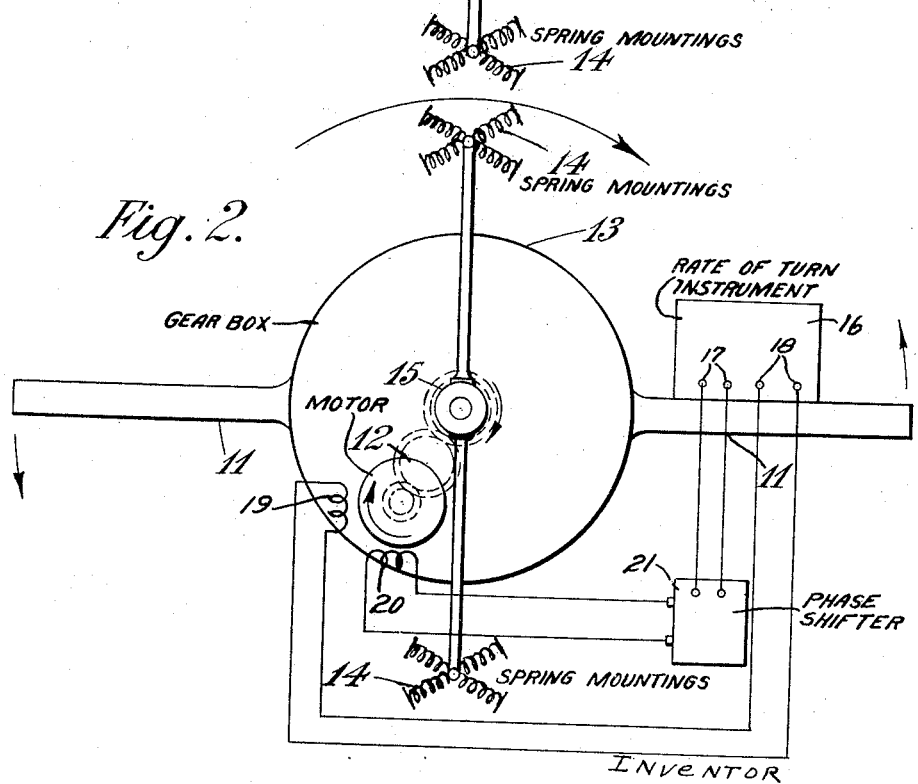

Patented Jan. 24, 1950

2,495,591

UNITED STATES PATENT OFFICE 2,495,591

CONTROL EQUIPMENT FOR STABILIZING A PLATFORM MOUNTED IN A CRAFT

Frederick William Meredith, Cricklewood, London, England, assignor to S. Smith & Sons (England) Limited, a British company Application February 21, 1944, Serial No. 523,346
In Great Britain September 27, 1943

5 Claims. (Cl. 318—18)

This invention relates to control equipment for stabilising a platform pivoted in a craft for rotation about an axis about which it is to be stabilised. A platform stabilised in accordance with this invention provides a datum in the craft, and, when employed in an aircraft, for example, may be used for the level support of any instrument or device such as the following.

(a) A rate-of-turn instrument or an instrument for measuring angle of turn,
(b) A compass,
(c) A pitch detector or rate-of-pitch detector,
(d) A bomb sight,
(e) A camera,
(f) A telescope.

The invention makes use of a motor driving the platform about the stabilisation axis and a rate of turn device, such as described in U. S. Patent No. 2,455,939, the signal from which controls the motor to stabilise the platform in a datum attitude about the stabilisation axis.

Inevitably the platform and/or the instrument used to detect the rate of turn thereof have inertia and if the latter is carried on the stabilised platform the elasticity of the mounting thereof or of the coupling between it and the motor together with said inertia provide a resonant system whereby, at frequencies close to the resonant frequency, large phase displacements between the movement of the motor and the movement of the instrument occur whereby "hunting" is caused.

The object of this invention is to maintain the required phase relationship between the movement of the motor and the signal so that the resulting acceleration of the platform is maintained without requiring rigidity in the mounting which would result in undesirable vibration being transmitted from the aeroplane to the platform besides complicating the problem of installation.

According to this invention a pivoted platform is associated with the rate-of-turn device a signal from which controls the operation of a motor operatively connected with the platform through a gear box; the platform, gear box and motor are mounted on a spring mounting and the direction of rotation of the motor is arranged to be in the opposite sense to the direction of rotation of the platform and the masses are so selected that the product of the gear ratio and the moment of inertia of the motor is not less than the moment of inertia of the platform. Preferably the operative connection between the motor and the platform is made as rigid as possible.

It will be understood that the inertial reaction due to acceleration of the platform is counterbalanced by the opposing inertial reaction due to acceleration of the motor so that there is no resulting deflection of the spring mounting, or, if the product of the gear ratio and the inertia of the motor exceeds the inertia of the platform (and any masses moving therewith), the resulting deflection of the spring mounting is in the opposite sense to that which would cause hunting. Further, it will be appreciated that other periods due to inevitable elasticity of parts intended to be rigid will be shorter than the period provided by the spring mounting and will therefore be absorbed by deflection of the spring mounting. Vibration of the aeroplane will likewise be absorbed as in a conventional "anti-vibration" mounting.

In the accompanying drawings:

Figure 1 represents diagrammatically one embodiment for stabilising a platform pivoted in an aircraft about an axis parallel to the aircraft pitch axis and, Figure 2 another embodiment of the invention.

Referring to Figure 1, the platform 11 is carried on the output shaft 15 of the gear-box 13 which is mounted in the framework of the aircraft by springs 14. The shaft 15 is parallel to the pitch axis of the aircraft.

The rotor of the two phase electric motor 12, carried in gear-box 13, is coupled to the input of gear-box 13 as shown. The axis of the rotor is parallel to shaft 15 and, as shown, the gearing is such that the rotor and the shaft 15 rotate in opposite senses.

A device 16 sensitive to rate of turn about the pitch axis of the craft is mounted on platform 11. This device is of the type described in U. S. Patent No. 2,455,939 and gives two A. C. outputs; the first output, appearing at terminals 17 is of constant amplitude and is derived from the output of the device 218, entitled "Automatic volume control" of Figure 5B of Patent specification No. 2,455,939, while the second output, appearing at terminals 18, has an amplitude proportional to the rate-of-pitch to which the device 16 is subjected and is derived from the output of the "Y-Y amplifier" 216 of Figure 5B of the aforementioned patent specification. The two outputs have the same frequency and are in phase or in antiphase as the sense of the rate-of-turn is in one direction or the other.

The terminals 18 are connected to the winding 19 of motor 12 while terminals 17 are connected through the phase-shifting device 21 to the other winding 20 of motor 12. The phase of the signal from terminals 17 is shifted through 90° by device 21 so that the signals applied to windings 19, 20 are in quadrature.

The motor 12 is of the type in which the acceleration is linearly related to the amplitude of the signal applied to signal winding 19. Such motors are very well known and are exemplified by two-phase hysteresis motors. A convenient type of motor is that described in British Patent No. 576,248 filed Dec. 31, 1943, and Jan. 27, 1944, and No. 576,249 filed Dec. 31, 1943, and Sept. 8, 1944, said patents corresponding to my U. S. patent applications Serial Nos. 526,435 and 526,436 respectively. The acceleration of motor 12 is therefore proportional to the amplitude of the signal from terminals 18 and hence to the detected rate-of-pitch. The platform 11 rotates in the opposite sense to the detected rate-of-turn and is thus stabilised in a substantially constant position: as soon as the craft turns about the pitch axis, the device 16 emits a signal which operates motor 12 to cause the platform 11 to rotate at such a rate that the device 16 is subject to zero rate of pitch i. e. the platform is rotated at a rate which is equal and opposite to the detected rate of pitch of the craft. If the two rates of turn are not equal and opposite, the device 16 emits a signal altering the rate of turn of the platform until the two rates of turn are again equal and opposite.

Unless precautions are taken, the stabilising system described above is liable to hunt. If R is the gear ratio of gear-box 13, $I_m$ is the moment of inertia of the motor 12 and $I_p$ is the moment of inertia of the platform 11, the gear-box 13, motor 12 and platform 11 are so designed that $RI_m$ is not less than $I_p$. It can be shown mathematically that this is the only condition to be fulfilled to render the system stable and hunt-free.

Figure 2 illustrates an alternate arrangement to that shown in Figure 1. In this case, the casing of the gear-box 13 is rigidly attached to the platform 11 and the output shaft 15 of the gear-box is mounted elastically in the aircraft. The axis of the rotor motor 12 and the output shaft 15 are again parallel but, as shown, the gearing is such that the rotor and output shaft rotate in the same sense. In this embodiment of the invention, the moment of inertia of the platform 11 includes that of the gear-box 13, in which case the components are again designed so that $RI_m$ is not less than $I_p$. It can be shown mathematically that if this condition is fulfilled the system is stable and hunt-free.

It will be understood that if the acceleration of the motor is proportional to the detected rate-of-turn, this is equivalent to the motor having a speed proportional to the displacement of the platform 11 or the integral of the rate-of-turn thereof.

I claim:

1. Control equipment for stabilising a platform pivoted in a craft about an axis about which it is to be stabilized comprising, a motor having a rotor axis arranged parallel to said platform axis, a gear box coupling the motor to the platform to effect rotation thereof about the said axis in the opposite direction to the motor, a rate-of-turn device mounted on the platform and responsive to the rotation thereof about the said axis, control connections between the device and the motor, said control connections operating the motor in a direction to effect stabilization of the platform and at a rate proportional to the displacement of the platform about said axis, and a spring mounting carrying platform, gear box and motor, the product of the gear ratio and the moment of inertia of the motor being not less than the moment of inertia of the platform and parts mounted thereon.

2. Control equipment for stabilizing a platform pivoted in a craft about an axis about which it is to be stabilized comprising a gear box having parallel input and output shafts adapted to rotate in opposite directions the platform being mounted on the output shaft, a motor carried by the gear box and coupled to the input shaft, a spring mounting for the gear box, a rate-of-turn device mounted on the platform and responsive to the rotation thereof about the axis of the output shaft and control connections between the device and the motor, said control connections operating the motor in a direction to effect stabilization of the platform about the said axis and at a rate proportional to the displacement of the platform about the said axis, the product of the gear ratio and the moment of inertia of the motor being not less than the moment of inertia of the platform and the device mounted thereon.

3. Control equipment for stabilizing a platform pivoted in a craft about an axis about which it is to be stabilized comprising a gear box having a casing and parallel input and output shafts adapted to rotate in the same direction the platform being secured to the gear-box casing, a motor carried by the gear box and coupled to the input shaft, a spring mounting resisting rotation of the output shaft, a rate-of-turn device mounted on the platform and responsive to the rotation thereof about the axis of the output shaft and control connections between the device and the motor, said control connections operating the motor in a direction to effect stabilization of the platform about the said axis, the product of the gear ratio and the moment of inertia of the motor being not less than the moment of inertia of the platform, the device and the gear box casing.

4. Control equipment for stabilizing a platform pivoted in a craft about an axis about which it is to be stabilized comprising, an electric motor having a rotor axis arranged parallel to said platform axis, a gear box coupling the motor to the platform to effect rotation thereof about tne said axis in the opposite direction to the motor, a rate-of-turn device mounted on the platform and responsive to the rotation thereof about the said axis, electrical connections between the device and the motor, said electrical connections operating the motor in a direction to effect stabilization of the platform and at a rate proportional to the displacement of the platform about the said axis, and a spring mounting carrying platform, gear box and motor, the product of the gear ratio and the moment of inertia of the motor being not less than the moment of inertia of the platform and parts mounted thereon.

5. Control equipment for stabilizing a platform pivoted in a craft about an axis about which it is to be stabilized comprising, a motor having a rotor axis arranged parallel to said platform axis, a gear box coupling the motor to the platform to effect rotation thereof about the said platform axis in the opposite direction to the motor, a device mounted on the platform and generating a signal proportional to the rate of turn of the platform about the said axis, control connections for applying the signal to accelerate the motor in a direction to stabilize the platform and at a rate proportional to that of the signal, and a spring mounting carrying platform, gear box and motor, the product of the gear ratio and the moment of inertia of the motor being not less than the moment of inertia of the platform and parts mounted thereon.

FREDERICK WILLIAM MEREDITH.

REFERENCES CITED

The following references are of record in the file of this patent:

UNITED STATES PATENTS

| Number | Name | Date |
|---|---|---|
| 1,731,776 | Henry | Oct. 15, 1929 |
| 1,768,128 | Marmonier | June 24, 1930 |
| 1,876,254 | Marmonier | Sept. 6, 1932 |
| 1,988,458 | Minorsky | Jan. 22, 1935 |
| 2,005,530 | Boykow | June 18, 1935 |
| 2,014,825 | Watson | Sept. 17, 1935 |
| 2,126,910 | Moseley | Aug. 16, 1938 |
| 2,242,253 | Lyman | May 20, 1941 |
| 2,361,790 | Noxon | Oct. 31, 1944 |
| 2,455,939 | Meredith | Dec. 14, 1948 |